United States Patent
Wilkinson

[19]

[11] Patent Number: 5,817,968
[45] Date of Patent: Oct. 6, 1998

[54] GAS GENERATION WITH HIGH PRESSURE SENSITIVITY EXPONENT PROPELLANT

[75] Inventor: David B. Wilkinson, Xenia, Ohio

[73] Assignee: The United States of America as represented by the Secretary of the Air Force, Washington, D.C.

[21] Appl. No.: 88,348

[22] Filed: Aug. 3, 1987

[51] Int. Cl.[6] .............................. F42B 15/10; F02K 9/08
[52] U.S. Cl. ................................ 102/381; 60/253; 60/254
[58] Field of Search ............................... 102/381; 60/251, 60/253, 254

[56] References Cited

U.S. PATENT DOCUMENTS

| | | | |
|---|---|---|---|
| 2,875,577 | 3/1959 | Odenkirchen | 60/35.6 |
| 2,940,251 | 6/1960 | Prentiss | 60/35.6 |
| 2,988,877 | 6/1961 | Shope | 60/35.6 |
| 3,031,842 | 5/1962 | Ledwith | 60/35.6 |
| 3,073,112 | 1/1963 | Bleikamp, Jr. | 60/35.6 |
| 3,142,959 | 8/1964 | Klein | 60/35.6 |
| 3,173,249 | 3/1965 | Wiggins | 60/35.6 |
| 3,248,875 | 5/1966 | Wolcott | 60/35.6 |
| 3,279,187 | 10/1966 | Lindman | 60/245 |
| 3,287,912 | 11/1966 | Wehlow et al. | 60/256 |
| 3,392,524 | 7/1968 | Caveny | 60/39.47 |
| 3,452,544 | 7/1969 | Glick et al. | 60/254 |
| 3,691,770 | 9/1972 | Nunn | 60/254 |
| 3,701,256 | 10/1972 | Pelham et al. | 60/39.47 |
| 3,712,227 | 1/1973 | Turner | 102/49.7 |
| 3,731,629 | 5/1973 | Lombardi | 102/49.7 |
| 3,807,169 | 4/1974 | Bradford | 60/261 |
| 3,811,380 | 5/1974 | Glass | 102/49.7 |
| 3,815,359 | 6/1974 | Thurston | 60/254 |
| 3,844,118 | 10/1974 | Wilkinson | 60/251 |
| 4,023,355 | 5/1977 | McDonald | 60/254 |
| 4,345,427 | 8/1982 | Whitesides, Jr. | 60/234 |
| 4,355,663 | 10/1982 | Burkes, Jr. et al. | 60/253 X |
| 4,444,006 | 4/1984 | Burkes, Jr. et al. | 60/251 |
| 4,449,361 | 5/1984 | Hähnel | 60/254 |
| 4,450,679 | 5/1984 | Hähnel | 60/251 |
| 4,483,139 | 11/1984 | Engl | 60/251 |
| 4,574,586 | 3/1986 | Gabrysch | 60/254 |
| 4,628,688 | 12/1986 | Keirsey | 60/251 |
| 4,765,565 | 8/1988 | Buchele-Buecher et al. | 60/254 X |

OTHER PUBLICATIONS

D.B. Wilkinson and J.M. Greer Jr., "The Case For High Exponent Gas Generator Propellants", JANNAF Conference, Mar. 1985, Distribution limited to U.S. Government agencies only; test and evaluation.

*Primary Examiner*—Peter A. Nelson
*Attorney, Agent, or Firm*—Gerald B. Hollins; Thomas L. Kundert

[57] ABSTRACT

Gas generator apparatus usable with a ducted rocket propellant having a high exponent burn rate, a burn rate that is burn chamber pressure sensitive to a greater degree than are normally used propellants. The gas generator includes elementary pressure regulating elements and apparatus for damping movement of the pressure regulating elements to remove oscillatory components of motion therefrom. Burn rate operating point determination and the stability characteristics thereof are described along with the effects of variations in propellant burn rate exponent and regulating element parameters.

13 Claims, 4 Drawing Sheets

DUCTED ROCKET

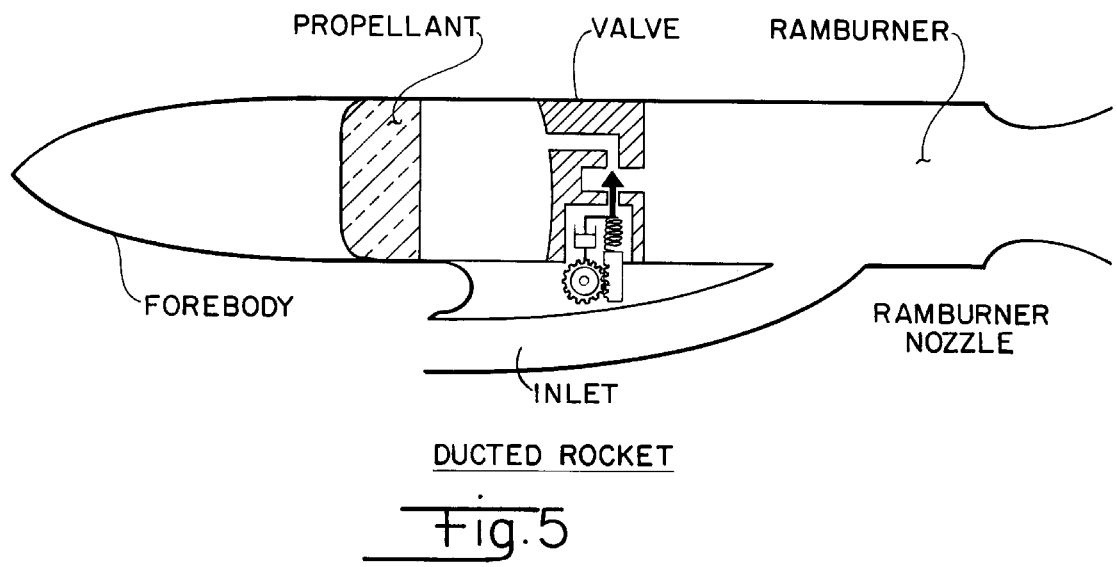
Fig. 5
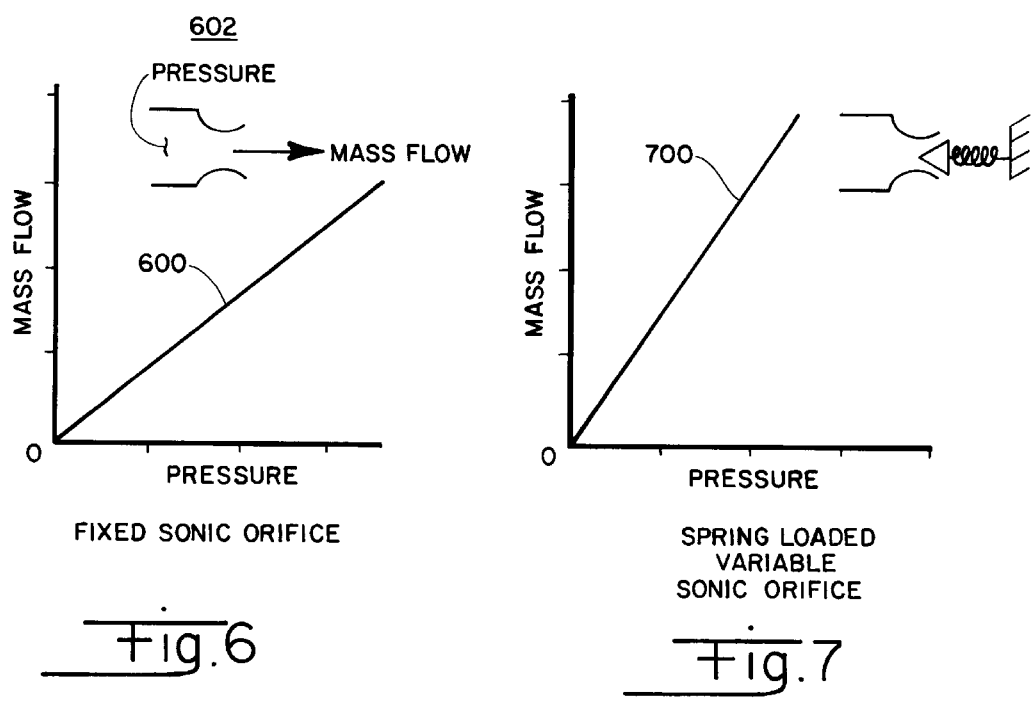
Fig. 6
Fig. 7

GAS GENERATION WITH HIGH PRESSURE SENSITIVITY EXPONENT PROPELLANT

RIGHTS OF THE GOVERNMENT

The invention described herein may be manufactured and used by or for the Government of the United States for all governmental purposes without the payment of any royalty.

BACKGROUND OF THE INVENTION

This invention relates to the field of solid fuel propellant gas generators having a fuel grain with a burn rate pressure sensitivity exponent that is numerically large—gas generators that are highly responsive in positive correlation to the gas pressure within the propellant burn chamber.

Classification of solid rocket fuels according to their response to burn chamber pressures is now well known in the rocket art. With certain changes in the composition of rocket fuels, for example, with variations of the particle size of certain ingredients in the grain composition, the degree of burn rate response to burn chamber pressure is alterable to accommodate a variety of propulsion requirements. Propellant response to burn chamber pressure is moreover frequently described by the equation $$\dot{r} = K_1 p^n$$

where $\dot{r}$ is the linear burn rate (in inches per second, for example), $K_1$ is a constant describing the burn rate at unit pressure (inches per second at one pound per square inch absolute, pressure, for example), p is the burn chamber pressure (in psia, for example), and n is the burn rate exponent, a descriptor of propellant pressure sensitivity. A related equation frequently used to describe the rate of gas generation where the burn surface area remains constant is $$\dot{M} = K_2 p^n$$

where $\dot{M}$ is the rate of gas generation, $K_2$ is another constant, p is the gas generator pressure, and n is again the burn rate exponent.

For most present-day fixed nozzle solid fuel rockets, propellants with exponent values in the range of 0.2 to 0.6 are used. The rocket motor related but distinguishable fuel-rich throttled gas generators presently use propellants with n in the narrower range of 0.5 to 0.7. Higher values of the exponent n are desirable in some applications, especially where the gas produced is not directly expanded in a nozzle to produce thrust and where short response times with wide throttling range are desirable from the gas generator under consideration. Large values of the exponent n have, however, come to be viewed with some concern, because fixed sonic throat gas generators are statically unstable when operated with high exponent (n=1 or greater) propellant. The rapid increase of burn rate which results from increased burn chamber pressure in such gas generators will proceed in vicious circle fashion to a catastrophic termination condition in the absence of suitable and reliable gas generator controls. In similar circular fashion, flow rate can fall far below the desired value. Limited attempts have been made to actively control rockets with propellant exponents lower than, but near a value of one. In these attempts, pintle nozzles, with active feedback control have been used. Difficulties were experienced, however, because of materials problems caused by the high temperature of the rocket gases, and because of frequency response requirements resulting from the low rates of motor free volume to throat area (the term L* is used in the art to designate this volume-to-area ratio).

Since fuel gas generators for ducted rockets generate cooler gases than do rockets and since the free volume fill times are longer for ducted rocket gas generators than for rockets (larger L* values are present), throat valve throttled ducted rocket gas generators are generally more compatible with high exponent propellants. The present invention concerns several aspects of gas generator control for propellants having burn rate exponents which lie above the previously used 0.2 to 0.7 exponent range.

SUMMARY OF THE INVENTION

In the present invention the combination of a propellant with a high pressure exponent, a simple and reliable pressure vessel throat control arrangement, and damping of the throat control element movement are united to achieve a wide throttling range, short response times, low valve open/close area ratio, reduced valve actuator power requirements, and other advantages of a high burn rate exponent propellant while also achieving predictable, stable, and desirable propellant gas generation capability. The term "propellant" is used herein with respect to the gas generator solid charge even though the gas output from the gas generator is not necessarily used directly to develop propelling thrust. Such generated gases may be used as fuel in a ramjet or ducted rocket apparatus of the type shown in FIG. 5 of the drawings, for example.

It is an object of the present invention therefore, to enable the practical use of propellants having high burn rate pressure response exponents.

Another object of the invention is to provide a gas generation apparatus usable with propellants having a range of pressure response exponents.

Another object of the invention is to provide a pressure operated throat control apparatus for use with high exponent propellants in achieving desirable gas generator performance.

Another object of the invention is to provide a simple and unencumbered apparatus for controlling the pressure in a propellant burn chamber.

Another object of the invention is to provide a propellant burn chamber control arrangement which is statically and dynamically stable and predictable in operating characteristics.

Another object of the invention is to provide a propellant burn chamber pressure control arrangement in which perturbations and fluctuations in the propellant burn rate are accommodated in a stable manner.

Another object of the invention is to provide a propellant burn chamber pressure control arrangement in which simple spring biasing of the control member can be utilized.

Another object of the invention is to reduce gas generator mass flow error arising from precipitation coating of valve parts during generated gas flow therethrough.

Another object of the invention is to reduce the requirements for throttle valve movement control energy supplied from a valve operating servosystem.

Another object of the invention is to reduce the gas transmitting area excursions required of a gas generator throttle valve.

Additional objects and features of the invention will be understood from the following description and the accompanying drawings.

These and other objects are achieved by a solid propellant variable flow gas generator which includes the combination of a pressure vessel having a pressure responsive variable aperture outlet portion, a charge of solid fuel grain disposed in the pressure vessel, the fuel grain being of the high burn rate exponent type, having a pressure sensitive burning rate, and damping means coupled with the pressure vessel variable throat outlet portion for damping pressure responsive oscillatory movement tendencies thereof.

BRIEF DESCRIPTION OF THE DRAWINGS

FIG. 5 shows a ducted rocket example of a device to which a variable flow gas generator might be connected.

FIG. 6 shows the operating characteristics or demand curve for a fixed sonic orifice.

FIG. 7 shows the operating characteristics or demand curve for a variable spring-loaded sonic orifice.

DETAILED DESCRIPTION

Figure 1:
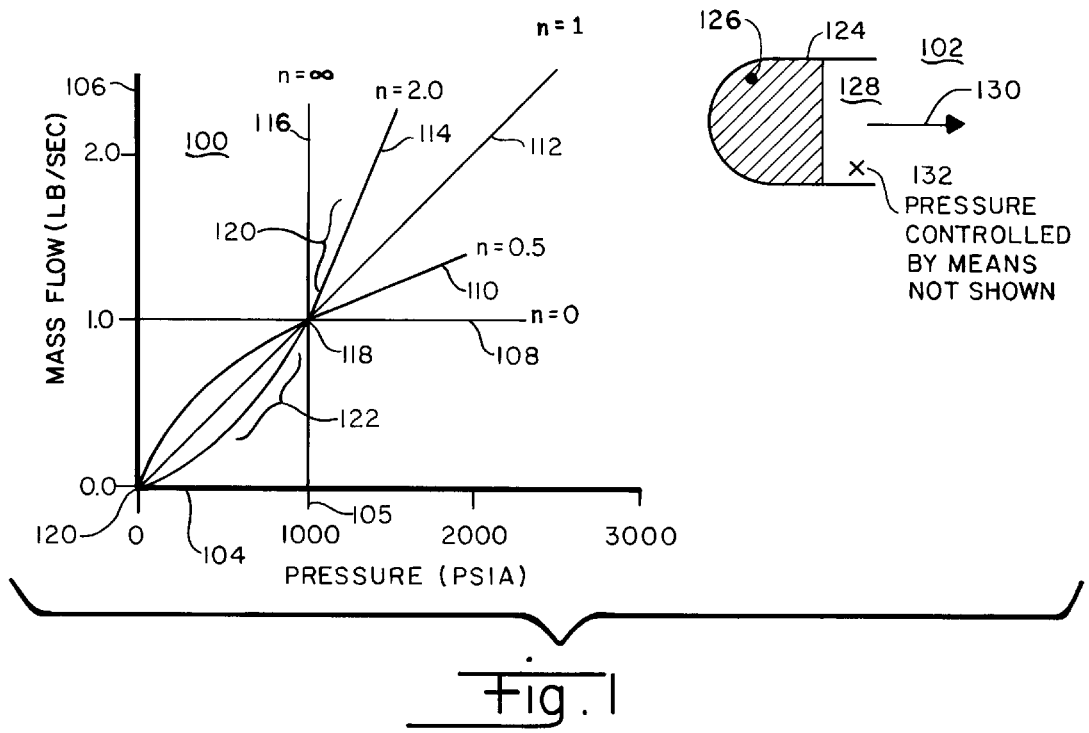
FIG. 1 shows the pressure responsive characteristics of several solid propellants of differing burn rate exponent value along with a representative burn apparatus for such propellants.

FIG. 1 in the drawings shows the burn characteristics of several different propellant types which may be used in the rocket gas generator of the present invention. In order to describe the interaction of various propellant types with various nozzle types, FIG. 1 and the early part of this description examines first the propellant characteristics, this is followed by a discussion of nozzle characteristics; and finally, the interaction between propellants and nozzles is considered. The FIG. 1 drawing therefore also shows a representative propellant burn chamber, with the propellant characteristics being shown at 100 in FIG. 1 and the representative burn chamber at 102. Each of the different propellant describing curves in FIG. 1, the curves 108, 110, 112, 114 and 116, represents an end-burning grain sample of fixed, predetermined burn surface area and different burn rate exponent. Each of the FIG. 1 propellant samples is, for discussion purposes, made to have an identical burn rate at one predetermined pressure such as the pressure of 1000 psia that is indicated at 105 along the horizontal axis 104 of the FIG. 1 curve family. Propellant burn rate is described in terms of mass flow, a quantity measured, for example, in pounds per second, and indicated along the vertical axis 106 of the curve family 100 in FIG. 1. The point 118 in FIG. 1 represents, for example, a flow of 1 pound per second at a pressure of 1000 psia.

A simplified gas generator by which the characteristics 100 are determinable is shown at 102 in FIG. 1. In the generator 102, an end burning grain 126 of constant burn surface area is burning in the burn chamber 128 to produce gas mass flow 130 from the pressure vessel 124. For the purpose of generating the curves at 100 in FIG. 1, pressure in the generator 102 is controlled by some laboratory means, which makes pressure independent of mass flow—means such as a very large tank that is filled with an inert gas and brought to the test pressure prior to grain ignition. Apparatus of this type is known in the art as a strand bomb or a Crawford bomb.

The curves in the family 100 in FIG. 1 are arranged to conveniently compare the mass flow resulting from a propellant of pressure exponent value 1.0 with the mass flow resulting from pressure exponents below and above this value.

Turning now to nozzle characteristics, the fixed sonic throat or orifice, characterized at 600 in FIG. 6 of the drawings delivers mass flow that is proportional to absolute pressure. As a result of this proportionality between mass flow and absolute pressure, the curve 600 is actually a straight line. A simplified indication of the fixed sonic orifice under consideration is shown at 602 in FIG. 6. Parenthetically, it is interesting to recall from FIG. 1 that an n=1 propellant also delivers mass flow proportional to absolute pressure. The preference for a propellant having n is less than 1 for use in fixed sonic throat gas generators becomes apparent upon superimposing the nozzle characteristics of FIG. 6 upon the n=0.5 propellant characteristics of FIG. 1, as is shown in FIG. 8 of the drawings.

Figure 8:
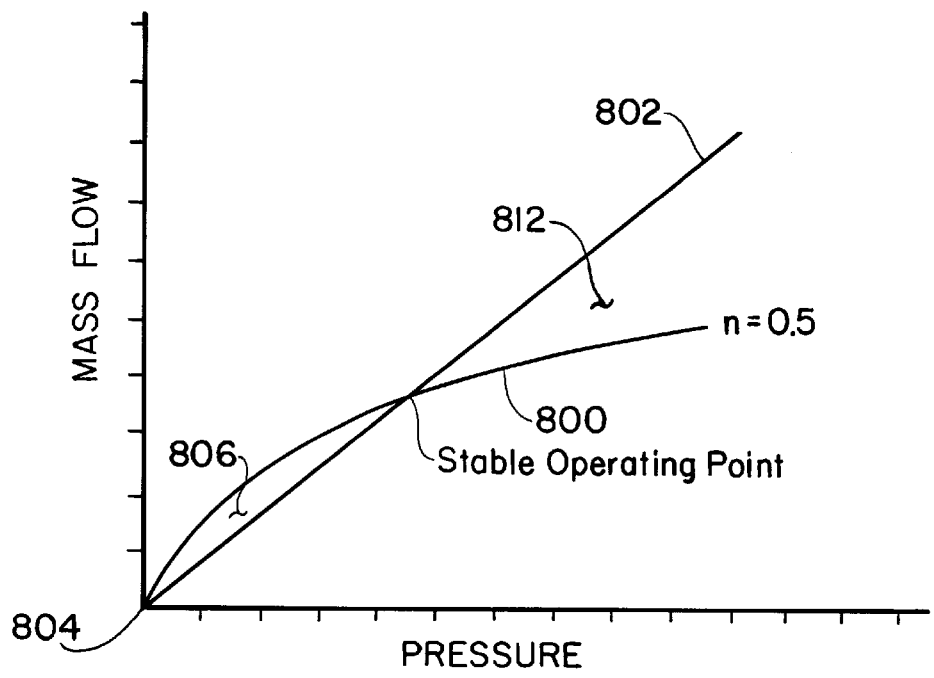
FIG. 8 shows the operating characteristics or supply and demand curves for the combination of a fixed sonic orifice and a propellant of low burn rate exponent.

The propellant (supply) curve 800 in FIG. 8 is seen to intersect the nozzle (demand) line 802 at two points, one of which is at the zero pressure and zero mass flow origin 804. This intersection at the origin is not a statically stable operating point, however, since at pressures slightly above zero, in the region 806 the propellant generates greater mass flow than the nozzle can accommodate for a given pressure—a condition which results in an increase in pressure until the stable operating point 810 is reached. Thereafter, in the region 812, further increases in pressure would cause nozzle demand to exceed gas supply, causing the pressure to decrease—this is a condition of static operating point stability. FIG. 8 therefore describes the operating point conditions which prevail in most present-day fixed orifice gas generators and rockets—the combination of low exponent fuel grain, statically stable operating point, and a fixed sonic orifice.

Figure 9:
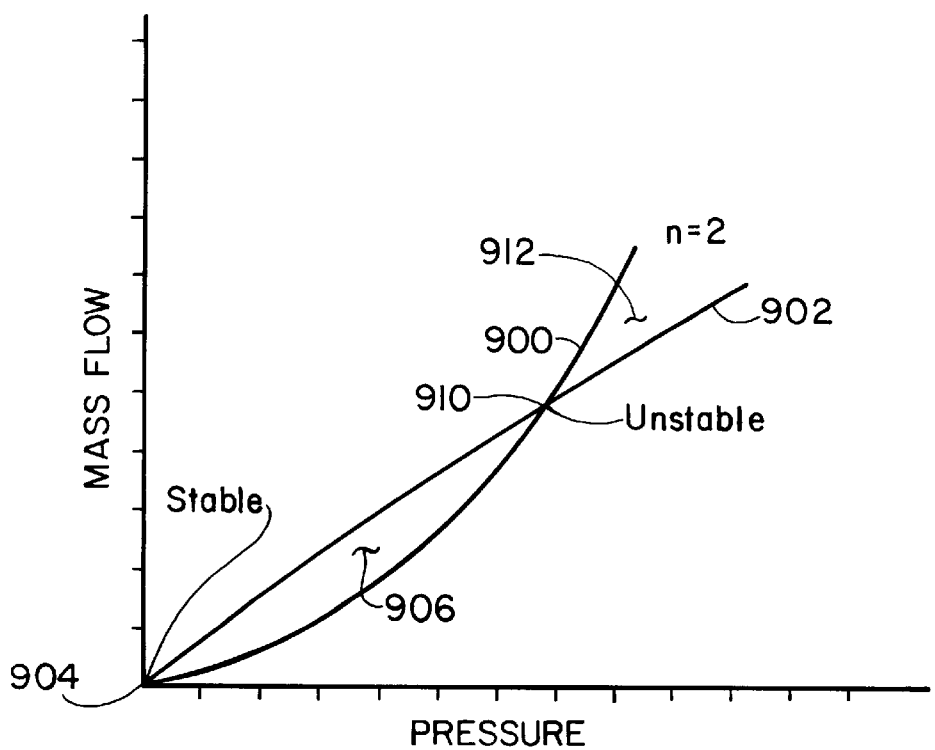
FIG. 9 shows the operating characteristics or supply and demand curves for the combination of a fixed sonic orifice and a propellant of high burn rate exponent.

If a propellant having an exponent greater than 1, as represented at 900 in FIG. 9, is operated with a fixed sonic orifice, the intersections of the supply and demand curves 900 and 902 are statically stable only at zero mass flow, and zero pressure, the point 904 in FIG. 9—a trivial operating point. If pressure exceeds that of the second non-zero operating point 910 so that operation in the region 912 occurs, then supply exceeds demand, which in turn causes increased pressure and a self-feeding sequence of burn rate and pressure increases until apparatus disintegration occurs. Below the operating point 910, however, in the region 906, the FIG. 9 high exponent fixed orifice system tends to cease burning—the other terminal condition for an unstable gas generator apparatus. The action of a fixed orifice unstable system of the FIG. 9 type therefore depends upon the size of the propellant ignitor and whether this ignitor is large enough to move the operating point beyond the "cease burning" region 906 into the "circular sequence" region 912. Neither of the operating regions 906 or 912 are, of course, satisfactory for a real-life gas generator apparatus—without something additional being provided to stabilize operation at the operating point 910.

Figure 4:
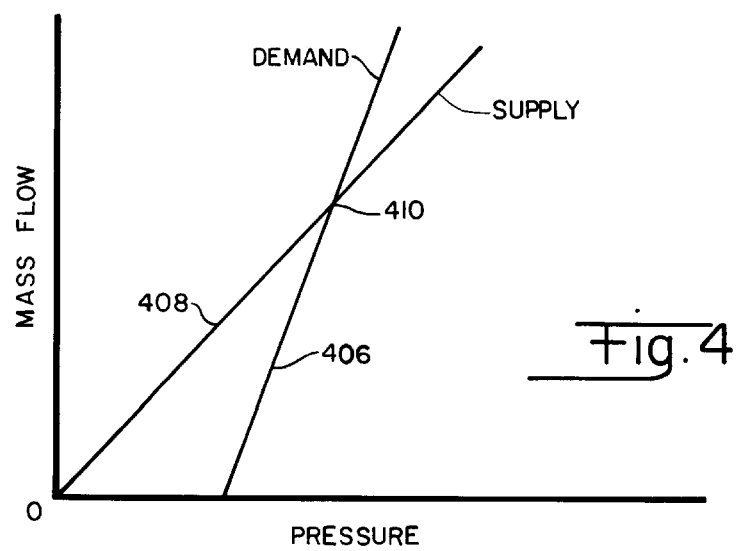
FIG. 4 shows operating point determination characteristics of a FIG. 2 type of gas generator.

Turning now to the case of a spring-loaded poppet valve such as is described by the curve 700 in FIG. 7 of the drawings, a superposition of these FIG. 7 characteristics upon the n=1 propellant characteristics is shown in FIG. 4 of the drawings. In the FIG. 4 combination the operating point intersection of the supply curve 408 and the demand curve 406 at zero mass flow and zero pressure is shown and is unstable in accordance with the analysis routine suggested above, while the operating point intersection which is shown at 410 is stable.

Figure 2:
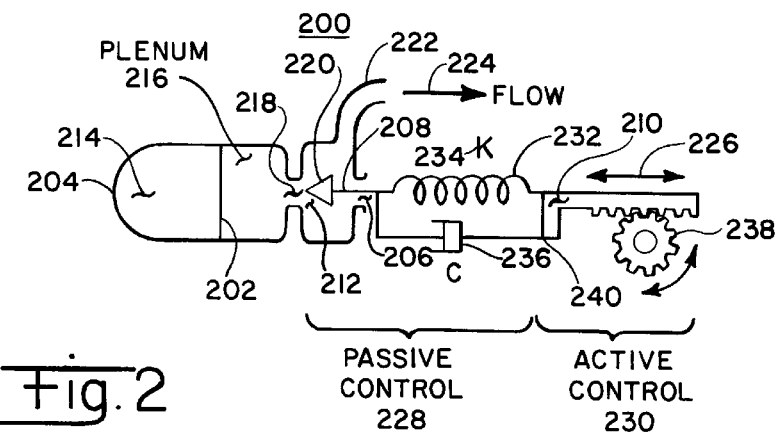
FIG. 2 shows a variable flow gas generator which uses high exponent propellant.

In FIG. 2 of the drawings there is shown a schematic representation of a gas generator apparatus 200 in which propellants of higher pressure sensitivity exponent may be considered for generating high-pressure, high-temperature gases for ramjet (ducted rocket) propulsion or for engine starting or other uses. A typical disposition of apparatus of the type shown in FIG. 2 in a ducted rocket structure is shown in FIG. 5 of the drawings. The FIG. 2 gas generator apparatus includes a pressure vessel 204, a charge of burnable propellant 214, and a burn chamber or plenum 216, in which is received a burn surface portion 202 of the propellant charge 214. The burn chamber or plenum 216 in the FIG. 2 gas generator communicates with an exit orifice 218 which is controllable as to gas transmitting area 212 in the manner of a spring-loaded poppet by a movable throttle member 220; the throttle member 220 controls the flow 224 of propellant burn gases through the orifice 218, the area 212, and the exit conduit 222.

The FIG. 2 gas generator also includes a valve stem member 208 which connects with the passive and active throttle control apparatus 228 and 230 by way of a gas sealable aperture 206. The passive control apparatus 228 includes a spring member 232 having a spring constant of K as indicated at 234 and having a shunt connected energy absorbing damping member 236. The active control apparatus 230 includes rack and pinion members 210 and 238 providing position control for the control face 240 which positions the right end of spring 232 in response to rotational movement of the pinion member 238 to provide an active signal input to the FIG. 2 apparatus.

The FIG. 2 gas generator represents schematically an arrangement by which propellants having a high burn rate exponent may be employed reliably for gas generation. Especially notable with respect to the FIG. 2 apparatus is the simple arrangement for determination of propellant burn pressures in the plenum or burn chamber 216. According to this arrangement, control of the throttle member 220 and plenum pressure is achieved by the spring member 232 without the use of feedback control systems or other complex and failure-susceptible arrangements. In the FIG. 2 gas generator, the position of the throttle member 220 and the size of the gas transmitting area 212 are controlled by the opposed forces acting on the throttle member 220, one of these forces originating in the pressure within the plenum 216, the other from the force of the spring member 232. During use of the FIG. 2 gas generator, the throttle member 220 achieves a position of balance between these opposing forces and thereby regulates or dynamically controls the size of the effective gas transmitting area 212 and the plenum pressure. The flow of generated gas in the gas transmitting area 212 may be sonic in nature. Areas taken normal to the flow such as the area 212 are somtimes referred to as stations.

Instantaneous variations of the burn rate of the propellant 214 are to be expected at the surface 202, such variations are known in the art and result from sources such as nonhomogeneity of the propellant mix, propellant particle size variations, and pressure fluctuations in the plenum 216. Without damping, the throttle member 220, loaded by the spring 232, in FIG. 2 would also be dynamically unstable in response to burn rate variations, since fill time considerations of the gas generator plenum 216 causes outward pressure force on the throttle member 220 to be greater when the member is moving to compress spring 232 than when it is moving to expand spring 232.

The response of the FIG. 2 gas generator to these instantaneous burn rate fluctuations and instantaneous pressure variations in the plenum 216 is largely influenced by the damping member 236 which is connected to the valve stem member 208. This damping member may have the form of a viscous damping dashpot or other damping arrangements as are known in the control mechanism art. The dynamic response of the FIG. 2 gas generator to intantaneous burn rate and pressure fluctuations is considered in greater detail in connection with the characteristics shown in the views of FIG. 3 of the drawings and described below herein.

By means of the rack and pinion members 210 and 238 in the FIG. 2 gas generator, the equilibrium position of the throttling member 220 may be varied to achieve greater pressure in the burn chamber or plenum 216. Such increased pressure, according to the pressure vs. burn rate characteristics of high exponent propellant, in turn causes a greater rate of burning and increased flow 224. This increased burn rate circular sequence is accomplished by movement of the rack member 210, as is indicated by the arrow 226. Such movement is achieved by rotation of the pinion 238 which engages the rack teeth and causes the spring 232 to apply greater force against the throttling member 220. This increased force requires greater propellant burn product pressures in the plenum 216 to reestablish equilibrium and maintain the gas transmitting area 212 opening into the pressure vessel 204. The pinion 238 can be connected to a manual or automatic pressure and thrust selection apparatus.

In FIG. 2, the effect of repositioning control face 240 in terms of the operating mass flow and pressures is to cause the demand line 406 of FIG. 4 to translate horizontally while remaining parallel to the original demand line. Movement of control surface 240 in FIG. 2 to the left, for example, causes the demand line 406 in FIG. 4 to translate to the right, and causing the operating point 410 to move up the supply line 408 in FIG. 4. to increased values of mass flow and pressure. Conversely, movement of the control face 240 to the right in FIG. 4 reduces mass flow and pressure causing the operating point 410 to move down the supply line.

Figure 3A:
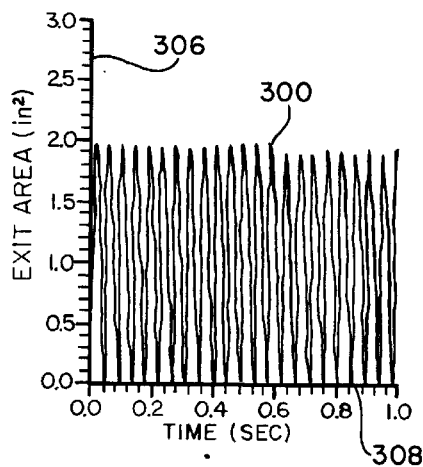
FIG. 3 shows the characteristics of the FIG. 2 burn arrangement under a variety of operating conditions.
Figure 3B:
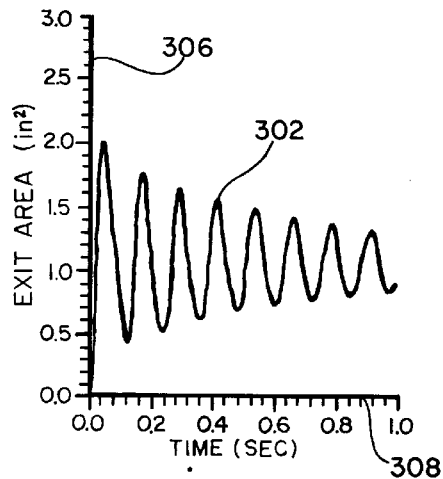

FIG. 3 of the drawings shows three types of dynamic response or three degrees of dynamic stability which can be experienced from the gas generator of FIG. 2 as a result of instantaneous ignition of the burn surface with the throttle member 220 initially fully closed. The oscillatory response 300 shown in FIG. 3A can be expected when the FIG. 2 apparatus is provided with a spring 232 having a constant preload value and a force exertion which is independent of throttling member position (i.e., a constant force of preload magnitude) and a total absence of damping in the member 236. The scales at 306 and 308 in FIG. 3 indicate effective area at 212 in FIG. 2 and elapsed time respectively; similar variations of other parameters in the FIG. 2 apparatus such as pressure in the burn chamber or plenum 216 or mass flow at 224 can be used as indications of FIG. 2 gas generator response to stimuli.

Figure 3C:
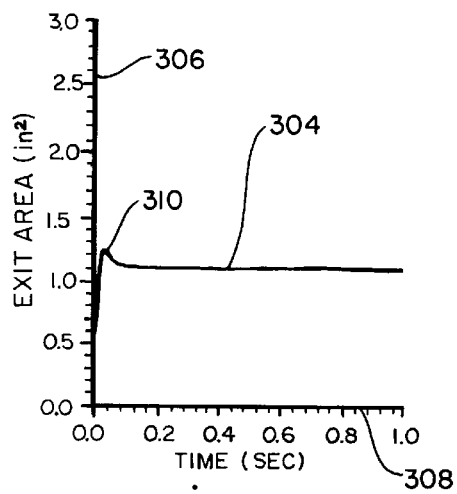

The response 300 in FIG. 3A represents an undamped oscillatory condition in which throttle position is limited only by physical constraints of the FIG. 2 system such as the travel limits of the throttle member 220. A damped sinusoid response for the FIG. 2 system is indicated at 302 in FIG. 3B. A response of this nature is to be expected with the addition of damping by the member 236 to the FIG. 3A indicated conditions for the FIG. 2 gas generator. The response indicated at 304 in FIG. 3C is obtained from the FIG. 2 system when both damping and a finite spring constant, that is, a variation of spring force with throttling member position are added to the gas generator.

Clearly the presence of both damping and a finite spring constant provides the most desirable response for the FIG. 2 apparatus for use in a practical gas generator apparatus. Variations of the three parameters of spring preload, spring constant, and damping factor can, of course, be used as a means for achieving responses intermediate those shown in FIGS. 3A, 3B and 3C, and for adjusting the degree of initial overshoot as indicated at 310 in FIG. 3C. Generally, a particular embodiment of the FIG. 2 apparatus can be arranged to have the optimum "critical damping" wherein the overshoot 310 is absent and attainment of the steady state value of exit area indicated in FIG. 3C occurs in the most rapid possible manner through the use of selective tuning or adjusting of the three factors of spring preload, spring constant, and damping factor.

The case of an n=1 propellant in combination with the apparatus of FIG. 2 is additionally interesting because in such a combination the steady-state valve open area 212 is the same for all mass flows 224. Valve motion is essential to cause changes in the pressure in the plenum 16, but nevertheless the steady-state operating point is always obtained with the same area 212, assuming no factors other than pressure are acting to change the burn rate. This result is advantageous where the generated gas flow contains solids which coat valve surfaces. With the substantially lower exponent previously used, control valves must operate nearly closed to command high mass flow rates, resulting in control valve openings of small hydraulic diameter (open area×4/circumference around open area) and such small openings are relatively vulnerable to blockage or substantial change in the open area due to plating of flow precipitates on the opening surfaces. The low valve movement advantages of an n=1 propellant are substantially present over a range of n values extending either side of the 1.0 value and are not limited to the situation where n is precisely 1.0. The reduced pressure excursions resulting from higher exponents in turn also result in the secondary advantage of less time being required to change from one commanded gas generator flow rate to another flow rate.

It should be noted in the apparatus of FIG. 2 that the passive control 228 is required to relieve pressure at a faster rate than it builds up in the gas generator. In other words, the opening time of the passive control 228 must be shorter than the rise time of the pressure in the gas generator. Where gas generator rise times are as long as several seconds, as is usually the case in ducted rocket gas generators, application of the invention is relatively straightforward using discrete components such as mechanical springs, oil-filled dampers, and shaft mounted throttle members or poppets. With fuel exponents substantially greater than one, and with shorter gas generator rise times, however, quicker responding embodiments of the passive control 228 are required. In such cases, the throttle member or pintle may be, for example, fabricated as a thin-walled cup of high temperature material supported on a sting with gas pressure providing the spring force urging the valve closed, and baffles behind the cup providing damping.

The gas generator of the present invention therefore provides for the use of simple controls to obtain both statically and dynamically stable operation with propellants having pressure exponents larger than the propellants currently in use. This arrangement provides the needed stability to a high exponent propellant generator and thereby provides for lower pressure excursions in the generator pressure vessel for the same commanded mass flow excursions in the gas generator output stream. The presently disclosed gas generator thus enables the use of fuels which burn at a rate that is directly proportional to or more than directly proportional to the pressure in the burn chamber. The presently disclosed gas generator also provides for the addition of an active pressure control to the passive gas generator control apparatus, but requires substantially less valve operator control power, especially in the case of fuel exponent values of 1 or more, in comparison with prior art systems which obtained stabilization with active rather than passive means.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. A solid propellant variable output gas generator comprising the combination of:

a pressure vessel having a positively correlated pressure responsive variable orifice outlet portion;

a solid fuel grain charge disposed in said pressure vessel, said fuel grain being of the high burn rate exponent type, having a pressure sensitive burning rate; and damping means coupled with said pressure vessel variable aperture outlet portion for damping pressure responsive oscillatory movement tendencies thereof.

2. The gas generator of claim 1 wherein said pressure responsive variable orifice portion includes a valve member and a spring member urging said valve member toward a closed condition thereof.

3. The gas generator of claim 1 wherein said variable orifice outlet portion includes a station of generated gas sonic flow.

4. The gas generator of claim 2 wherein said valve member is translationally movable.

5. The gas generator of claim 1 further including generated gas output controlling means connected with a free end of said spring member for selecting the operating pressure and gas output rate of said generator.

6. The gas generator of claim 1 wherein said variable aperture outlet portion includes a movable pressure limiting and pressure positioned member.

7. The gas generator of claim 6 further including a mechanical spring member connected in movement opposition with said pressure limiting pressure positioned member.

8. The gas generator of claim 7 wherein said damping means includes viscous damping means mechanically connected with said mechanical spring member for limiting the oscillatory motion response thereof to fluctuations in grain burn pressure.

9. The gas generator of claim 8 wherein said damping means includes a dashpot member.

10. The gas generator of claim 8 further including a pressure command signal input to said mechanical spring member.

11. A solid fuel gas generator apparatus comprising:

a high burn rate exponent charge of solid fuel grain;

substantially closed pressure vessel means for burning a receding surface portion of said fuel grain charge;

dynamic limiting means including a flow actuated movable limiting member disposed in a throat portion of said pressure vessel for regulating the vessel gas pressure and the burning rate of said fuel about predetermined values thereof by regulating the flow of grain burn gases from said pressure vessel;

a resilient member connected with said limiting member and urging said limiting member toward a closed position thereof; and means for damping the mechanical movement of said limiting member and resilient member;

whereby a stable controllable flow of output gas free of burn perturbation initiated and oscillatory variation is available from said high burn rate exponent fuel grain.

12. The gas generator of claim 11 further including active control means connected with said limiting member for varying said predetermined pressure and burn rate values and the generated gas output of said apparatus.

13. The gas generator of claim 11 wherein said limiting member and said resilient member comprise a spring loaded poppet.

* * * * *